US 6,668,054 B1
(12) United States Patent
Contino et al.

(10) Patent No.: US 6,668,054 B1
(45) Date of Patent: Dec. 23, 2003

(54) SERVICE DESK SYSTEM ARCHITECTURE FOR A MOBILE SERVICE WORKFORCE

(75) Inventors: Salvatore J. Contino, Livermore, CA (US); Mei Ling, Santa Clara, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 679 days.

(21) Appl. No.: 09/608,801

(22) Filed: Jun. 30, 2000

(51) Int. Cl.[7] .............................................. H04M 3/00
(52) U.S. Cl. ............................. 379/265.09; 379/265.11
(58) Field of Search ..................... 379/265.01, 265.05, 379/265.09, 265.11

(56) References Cited

U.S. PATENT DOCUMENTS 5,960,073 A * 9/1999 Kikinis et al. .............. 379/265
6,560,222 B1 * 5/2003 Pounds et al. .............. 370/353
6,563,788 B1 * 5/2003 Torba et al. ................ 370/229
6,577,726 B1 * 6/2003 Huang et al. ........... 379/265.02

FOREIGN PATENT DOCUMENTS

WO        WO 99/03247        1/1999

* cited by examiner

*Primary Examiner*—Creighton Smith
(74) *Attorney, Agent, or Firm*—Silicon Valley IP Group, PC; Kevin J. Zilka; Christopher J. Hamaty

(57) ABSTRACT

A system, method and computer program product are provided for allowing a user to remotely interface a computer telephony integration (CTI) architecture. A telephone call is initially received from a caller. Such telephone call is subsequently routed to a remote user. Before or during the telephone call, an identifier associated with the caller is ascertained. Information associated with the caller is then retrieved utilizing the identifier. Further, the information is sent to the remote user utilizing a network such as the Internet. The information is then capable of being viewed using a Hypertext Transfer Protocol (HTTP) application.

25 Claims, 6 Drawing Sheets

| CLIENT RECORD TABLE | |
|---|---|
| IDENTIFIER 1 | DESCRIPTION 1 |
| IDENTIFIER 2 | DESCRIPTION 2 |
| IDENTIFIER 3 | DESCRIPTION 3 |
| ⋮ | ⋮ |

Figure 4

SERVICE DESK SYSTEM ARCHITECTURE FOR A MOBILE SERVICE WORKFORCE

FIELD OF THE INVENTION

The present invention relates to computer telephony integration (CTI), and more particularly to interfacing with a server-centric CTI architecture.

BACKGROUND OF THE INVENTION

The telephone is among the most widely used communication equipment in the world. At first, telephones were merely convenient tools to allow people to communicate while physically separated. More recently, many people and organizations use telephones to market products and services, to provide technical support for consumer products, to allow callers to access their own financial data, and so forth. Thus, the telephone is becoming a major business and marketing tool.

In order to more effectively use telephones systems for business and marketing purposes, call centers have been developed. In a call center, a number of agents handle telephone communication with callers. The matching of calls between callers and agents is typically performed by software operating in conjunction with computerized switching equipment.

A simple example is used here to describe a few of the many advantages of using call centers. When a call is made to a call center, the telephone number of the calling line is typically made available to the call center by a telephone carrier. Based on this telephone number, software in the call center can access a database server to obtain information about the caller, using the caller's phone number as a key. The software routes the incoming call to an agent who can best handle the call based on predefined criterion (e.g., language skill, knowledge of products the caller bought, etc.). The software also causes the information about the caller, retrieved from the database, to be immediately transferred to a computer screen used by the agent. Thus, the agent can gain valuable information about the caller as the call is terminated, or even prior to receiving the call. As a result, the agent can more effectively handle the telephone transaction.

It can be seen from the above example that the enabling technology requires a combination of telephone switching and computer information processing technologies. The term commonly used for such combined technology is computer-telephony-integration (CTI).

In the past, various applications have been developed in association with the computer information processing technologies of CTI. Such applications are often referred to as service desk software. In use, the service desk software facilitates access to data in a database during a telephone call. As mentioned earlier, the data is identified in the database automatically by first ascertaining the identity of a caller using a telephone switch. With this information and under the direction of the service desk software, an operator may access desired data pertinent to providing a particular type of customer service.

Traditionally, the service desk software is installed on a plurality of clients which are hosted by a server that is integral with the CTI architecture. Often, the clients are networked locally in a central location. In some situations, the clients may even be networked between a few established sites. In any case, at least a portion of the service desk software is installed on each of the clients in order to allow proper communication with and access to the CTI server.

While this implementation affords a robust system, limitations exist regarding the flexibility of use. In particular, the foregoing architecture requires that users be present at one of the established sites in order to utilize the system. In the context of call centers, employees must be resident at a central location in order to perform work duties. Even if a wide area network were to be used to access a CTI server from an off-site location, such employees would still be required to install at least a portion of the server desk software on a remote client computer.

There is thus a need for service desk software that allows the use of CTI hardware from a remote location in a convenient, versatile manner.

DISCLOSURE OF THE INVENTION

A system, method and computer program product are provided for allowing a user to remotely interface a computer telephony integration (CTI) architecture. A telephone call is initially received from a caller. Such telephone call is subsequently routed to a remote user. Before or during the telephone call, an identifier associated with the caller is ascertained. Information associated with the caller is then retrieved utilizing the identifier. Further, the information is sent to the remote user utilizing a network such as the Internet. The information is then capable of being viewed using a Hypertext Transfer Protocol (HTTP) application.

In one preferred embodiment, a log-in request may be received from the remote user utilizing the network prior to providing an interface to the CTI architecture. Such log-in request may be sent using the HTTP application. As an option, the HTTP application may include a network browser.

In another preferred embodiment, the information may be automatically displayed upon the receipt thereof by the HTTP application. This may be accomplished using push technology in the form of a pop-up window or the like.

As an option, the CTI architecture may be a component of a call center. Accordingly, the user may be a call center employee. For additional mobility, the telephone call may even be routed to a cellular phone.

In another preferred embodiment, a method is provided for sending information to be read by a HTTP application. Initially, an event is identified. In response to the event, a uniform resource locator (URL) is generated. Thereafter, the URL is sent to a remote user utilizing a network such that information relating to the event is automatically displayed via the HTTP application. As an option, the event may be a CTI event, as set forth hereinabove. Further, the event may include a request to send a message between the remote user and another user, thus allowing messaging among users.

BRIEF DESCRIPTION OF THE DRAWINGS

FIG. 4 illustrates an exemplary record table associated with the CTI architecture;

DESCRIPTION OF THE PREFERRED EMBODIMENTS

Figure 1:
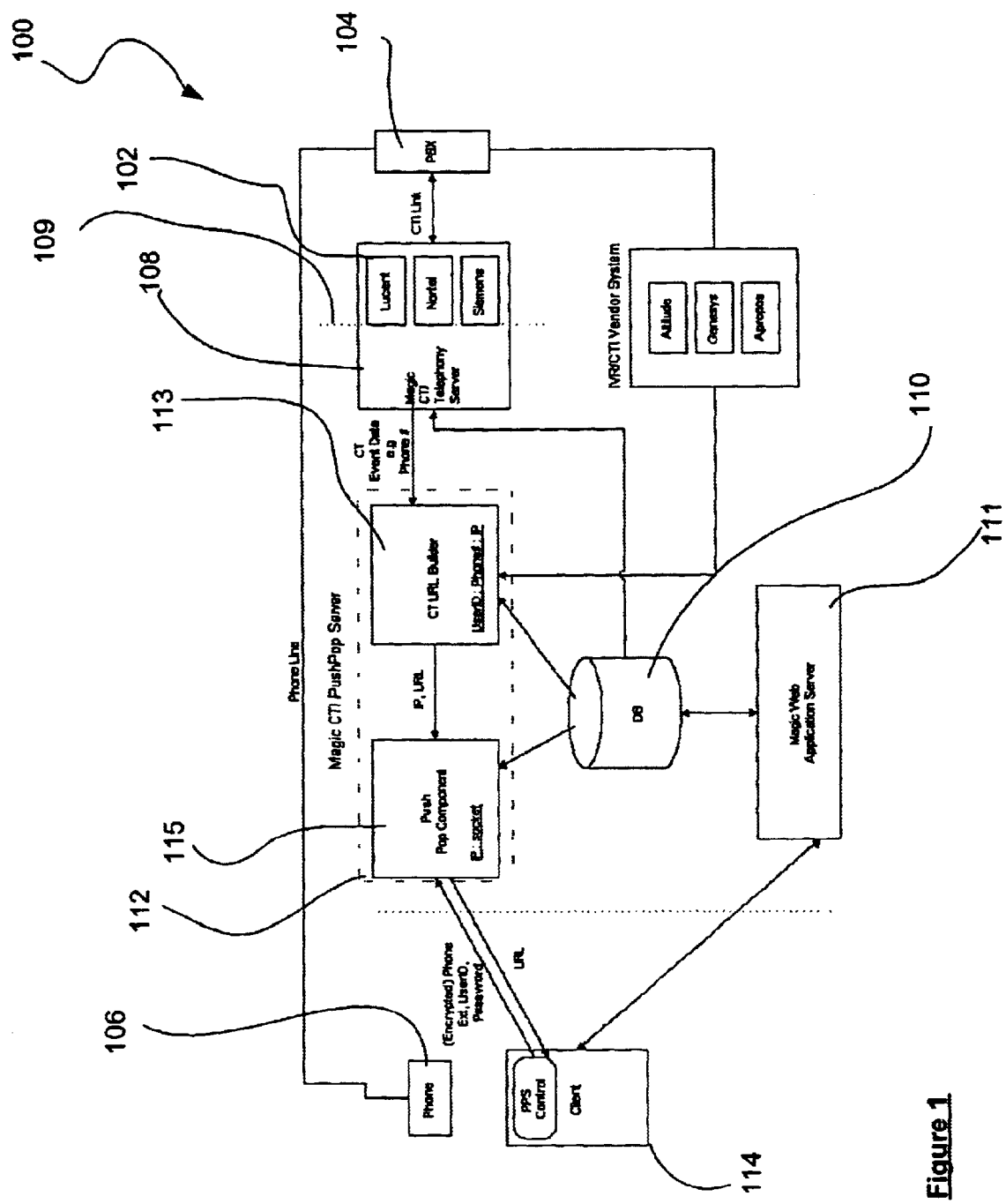
FIG. 1 illustrates a computer telephony integration (CTI) system in accordance with a preferred embodiment.

FIG. 1 illustrates a computer telephony integration (CTI) system 100 in accordance with a preferred embodiment. As shown, a telephone switch 102 is provided which is adapted to receive and initiate telephone calls from a telecommunication network 104. The switch 102 may include any commercially available switch manufactured by Lucent®, Nortel®, etc.

The switch 102 is capable of communicating with at least one telephone 106 for taking and making calls via telecommunication network 104. It should be understood that the telephone 106 may take the form of a hard-line telephone, a cellular phone, or any other type of mobile or stationary telephone. As an option, Internet telephony may also be employed.

Also included is a CTI server 108 which is coupled to the switch 102. In order to properly interface with the switch 102, the CTI server 108 includes an application program interface 109 for translating the various commands associated with the switch 102 and CTI server 108. The CTI server 108 is further coupled to a database 110 in order to store data for purposes that will become apparent hereinafter.

During use, the CTI server 108 is capable of running a service desk software application 111 that facilitates accessing and storage of data in the database 110. It should be noted that the aforementioned application program interface 109 tailors its translation of commands for allowing the service desk software application to run with a particular type of switch 102. One possible service desk software application that may be run on the CTI server 108 is Magic® which is manufactured by Network Associates, Inc.®

Also provided is a push server 112 which interfaces the CTI server 108 and the database 110. The push server 112 includes a URL builder module 113 and a push-pop module 115. In use, the push server 112 allows the functionality of the service desk software application 111 to be accessible from a plurality of computer workstations 114 that are remotely located. In a preferred embodiment, at least a portion of the computer workstations 114 are located remote from the remaining components of the CTI system 100. Communication may be provided via a network such as a local area network, wide area network, etc. Ideally, the network takes the form of the Internet which operates using TCP/IP or IPX communication protocols.

Together, the various components shown in FIG. 1 form a call center that may be used to handle telephone calls and maintain data for a variety of purposes. In the call center, operators may be employed for utilizing the telephones 106 and push server 112. While the present CTI architecture has been set forth, it should be noted that the principles set forth herein may be applied to any type of system including any or all of the foregoing components.

Figure 2:
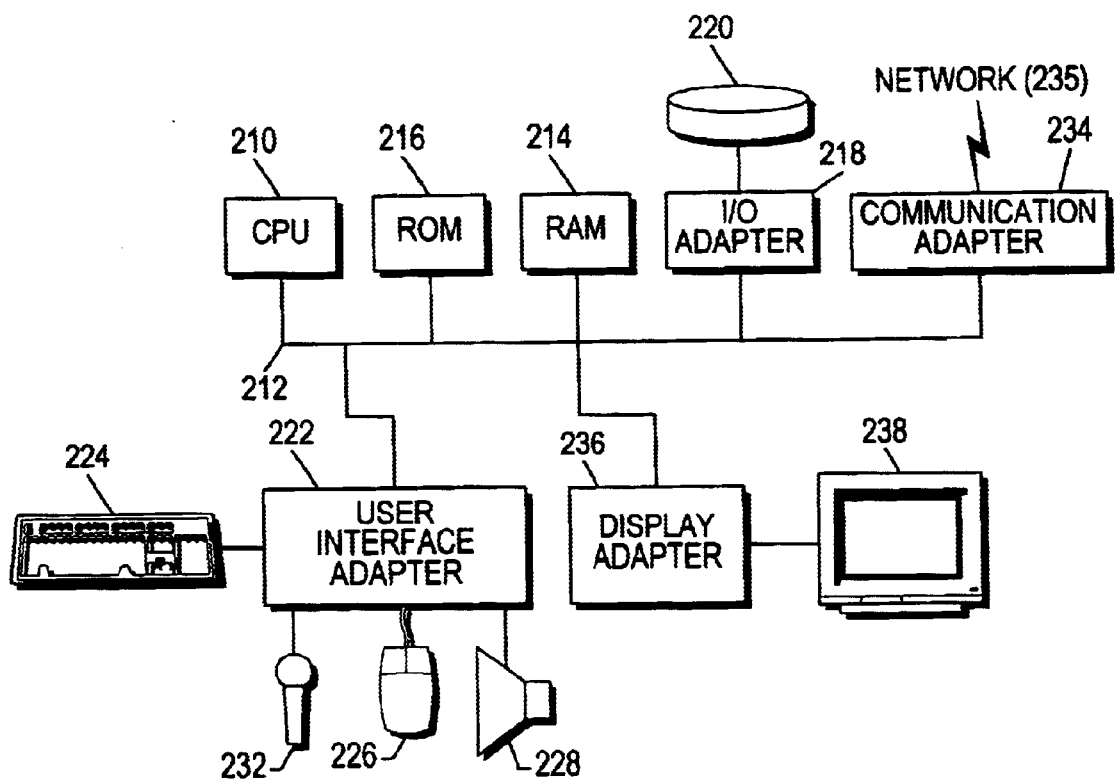
FIG. 2 shows a representative hardware environment associated with the client shown in FIG. 1.

FIG. 2 shows a representative hardware environment associated with the servers 108, 112 and/or computer workstation 114 shown in FIG. 1. Such figure illustrates a typical hardware configuration of a workstation in accordance with a preferred embodiment having a central processing unit 210, such as a microprocessor, and a number of other units interconnected via a system bus 212. The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
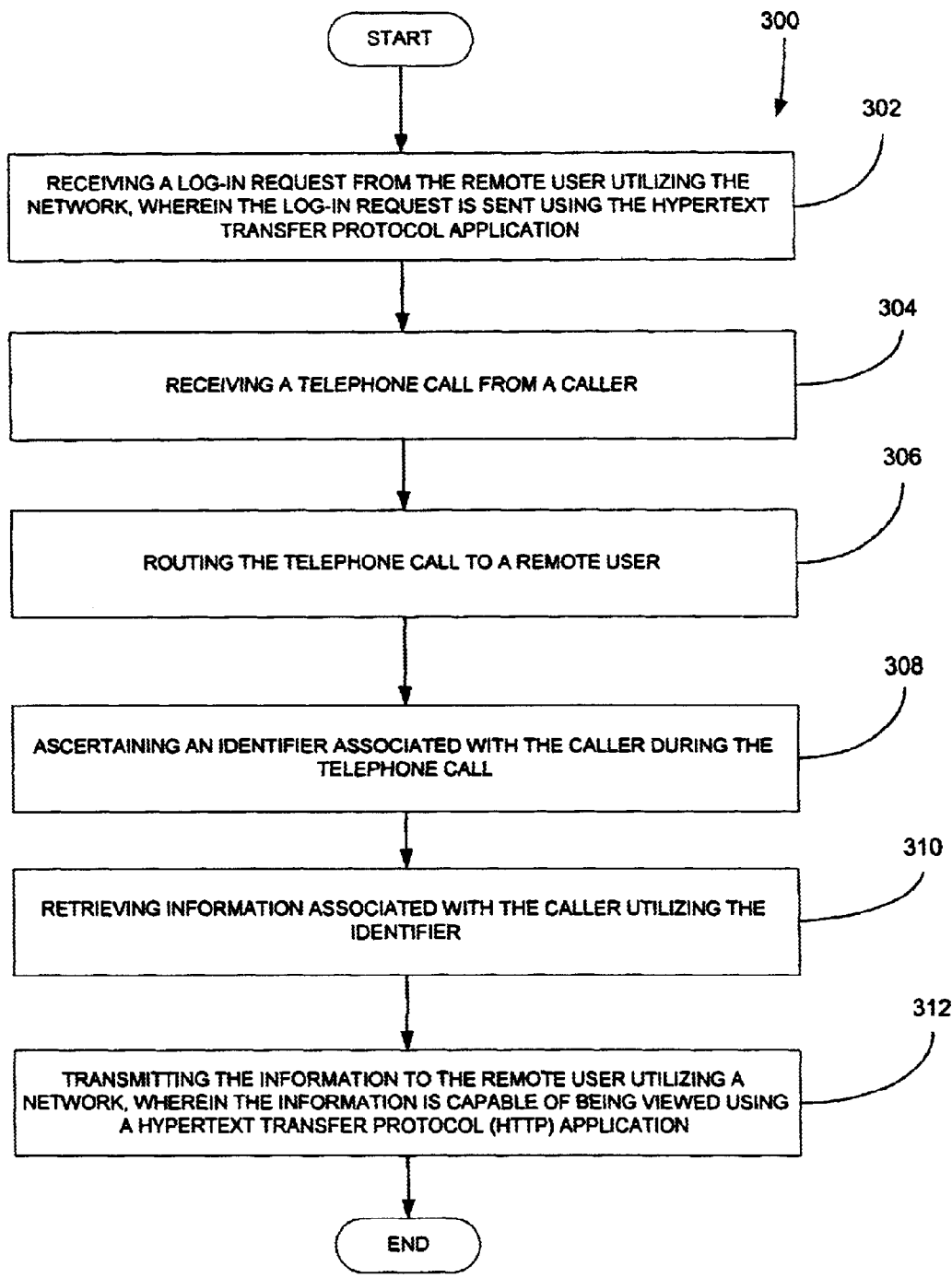
FIG. 3 illustrates a method for allowing a user to remotely interface a computer telephony integration (CTI) architecture.

FIG. 3 illustrates a method 300 for allowing a user to remotely interface a computer telephony integration (CTI) architecture. In a preferred embodiment, a log-in request may be received from the remote user utilizing a network prior to providing an interface to the CTI architecture. See operation 302. Such log-in request is received from one of the work stations 114.

The network preferably takes the form of the Internet. Further, such log-in request may be sent using a Hypertext Transfer Protocol (HTTP) application using TCP/IP or IPX communication protocols. As an option, the HTTP application may include a network browser such as Microsoft® Internet Explorer®, Netscape® Navigator®, etc.

Specifically, the user may access a predetermined web site using a designated Uniform Resource Locator (URL). Once accessed, the user may enter a user identifier and a password which is communicated to the push server 112. As an option, a telephone number may also be entered that corresponds to a telephone that is currently in the proximity of the remote user. In such case, the telephone number may be encrypted for privacy purposes. In the alternative, a telephone number may be looked up at the CTI server 108 using the user identifier and password.

After the log-in is complete, a telephone call may be received from a caller via the switch 102, as indicated in operation 304. With the telephone number of the remote user in hand, the CTI server 108 subsequently routes the telephone call to the remote user in operation 306.

Before or during the telephone call, an identifier associated with the caller may be ascertained. Note operation 308. Such identifier may be of any type including, but not limited to a social security number, telephone number, credit card number, or any other identifier at least partly unique to the user.

It should be noted that the identifier may be automatically or manually ascertained. For example, the identifier may include information available from the telephone call, e.g. caller I.D. In the alternative, the switch 102 may be capable of prompting the user to enter an identifier. In such embodiment, the identifier may be received from the user by way of a telephone touch pad, voice recognition, etc. These various types of entry may also be facilitated using the service desk software application running on the CTI server 108.

Information associated with the caller is then retrieved by the CTI server 108 from the database 110 utilizing the identifier in operation 310. As an option, the information in operation 310 may be retrieved from a record table. FIG. 4 illustrates an exemplary record table 400. As shown, the record table may include a plurality of different identifiers 402. Associated with each of the identifiers 402 are various descriptions, or information, 404 regarding the user which may be utilized during the telephone call by the operators 114. It should be noted that the record table 400 may be used to store information on any group of people including customers, clients, personnel, etc. Further, the record table 400 may include any type of information relating to the users in as many or few fields as desired. The information may also facilitate the input of data that may be gathered during the course of the telephone call.

Once the information is retrieved, the information is sent to the remote user utilizing the Internet. Note operation 312. The information is capable of being viewed using the HTTP application. In a preferred embodiment, the information may be automatically displayed upon the receipt thereof by the HTTP application. This may be accomplished using push technology in the form of a pop-up window or the like.

Figure 5:
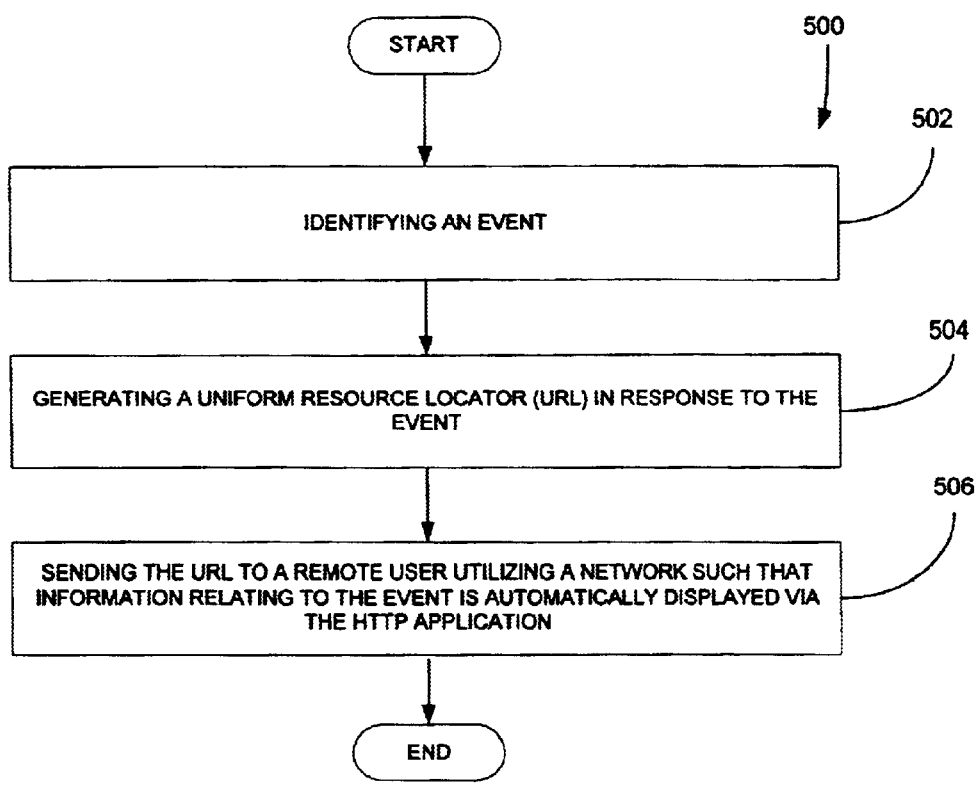
FIG. 5 illustrates a method for sending information to be read by a Hypertext Transfer Protocol (HTTP) application.

In one preferred embodiment, the information may be sent using URL'for the purpose of being read by the HTTP application. FIG. 5 illustrates one such method 500 for sending information to be read by the HTTP application. Initially, an event is identified in operation 502.

In response to the event, a URL is generated in operation 504 by the URL builder module 113 of the push server 112. Such URL may refer to a site on the network that is populated with the information retrieved in operation 310 shown in FIG. 3. Thereafter, the URL is sent to a remote user by the push module 115 of the push server 112 utilizing a network such that the information relating to the event is automatically displayed via the HTTP application.

While the event may include an occurrence of any type, the event may be a computer telephony integration (CTI) event in one preferred embodiment, as set forth hereinabove. Further, the event may include a request to send a message between the remote user and another user, thus allowing messaging among users.

In particular, a message may be entered via the HTTP application of a first user after which it is sent to the CTI system 100. In the alternative, the first user may be directly linked to the CTI system 100 for direct submission of the message by other means. Once the message resides in the CTI system 100, it may be sent to the second user in a manner similar to the information relating to the call. The graphical user interface for facilitating such messaging will be set forth in detail during reference to FIG. 6.

Figure 6:
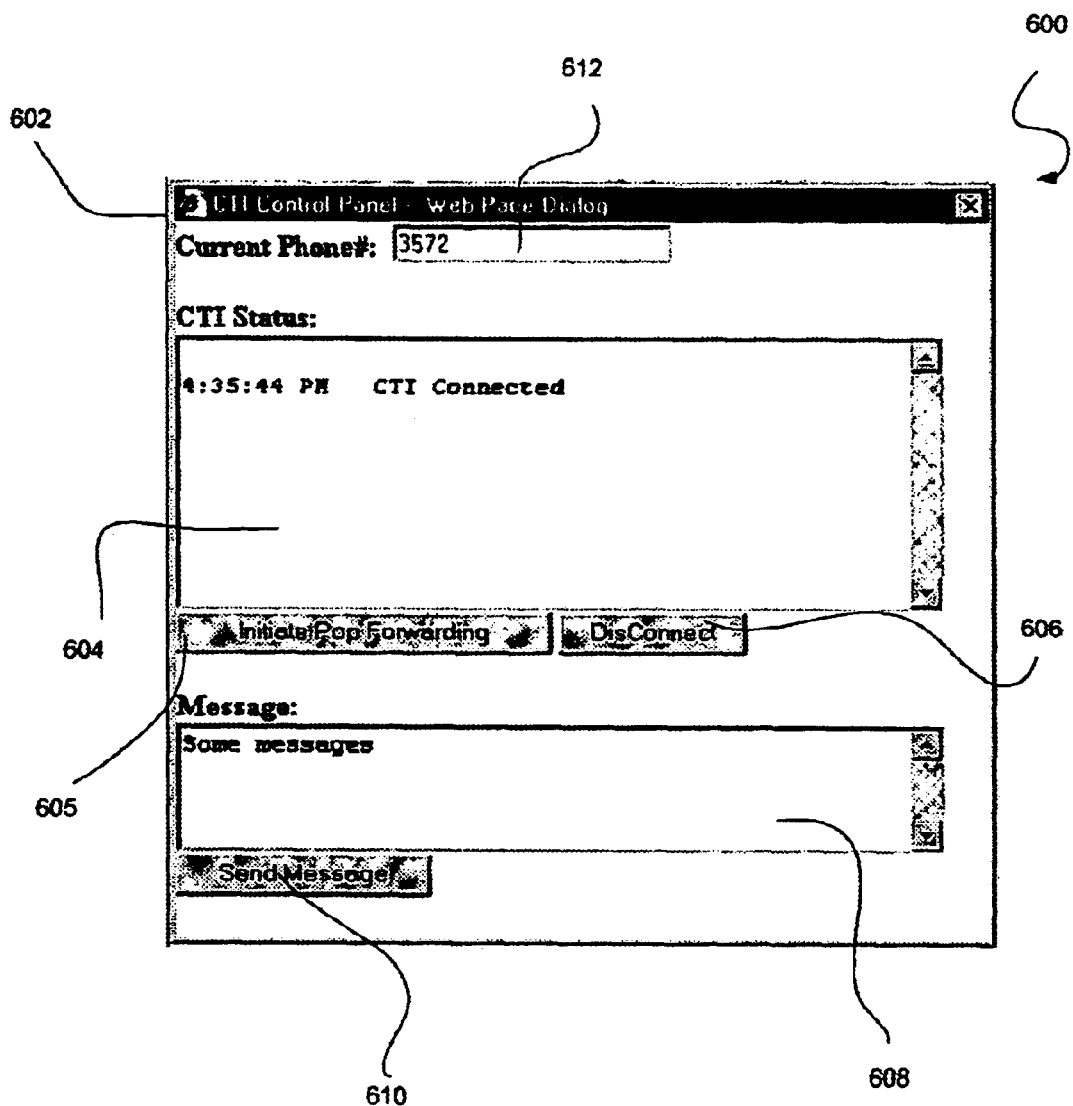
FIG. 6 shows a graphical user interface displayed with the HTTP application in order to allow a user to remotely interface a CTI architecture.

FIG. 6 shows a graphical user interface 600 displayed with the HTTP application in order to allow a user to remotely interface the CTI architecture. As shown, a pop-up window 602 may be used to display the information retrieved in operation 310 shown in FIG. 3. In particular, a window 604 may be used to display the information retrieved in operation 310 along with current status of the telephone connection between the remote user and the switch 102 that is established in operation 306 of FIG. 3. Moreover, the window 604 may indicate whether the telephone 106 is currently in communication with the switch 102, and the time when the communication was established.

As an option, an initiate pop forwarding icon 605 may be included for automatically forwarding information to another remote user. Any required data, i.e. receiver identifier, may be entered using fields that are displayed upon the selection of the pop forwarding icon 605.

Further included in the graphical user interface 600 is a disconnect icon 606 for communicating a command to the CTI system 100 utilizing the network, i.e. the Internet, upon the selection thereof. Such disconnect icon 606 disconnects the link between the switch 102, and the telephone 106 and computer workstation 114, thus terminating communication between the remote user and the CTI system 100.

In addition to the disconnect icon 606, a message window 608 is included for displaying messages received in a manner set forth during reference to FIG. 5. Also, a message send icon 610 may be used to enter messages to be sent to other users logged onto the CTI system 100. Any required data, i.e. receiver identifier, may be entered using fields that are displayed upon the selection of the message send icon 610.

Still yet, an extension window 612 may be included for identifying the telephone to which the telephone call is routed in operation 306 of FIG. 3. While not shown, this extension may be changed using a pull down menu, manual entry, or any other type of selection technique.

As an option, the CTI system 100 may be a component of a call center. Accordingly, the user may be a call center employee. As an option, the employee may interface the CTI architecture from a remote location such as a home, hotel room, etc. For additional mobility, the telephone call may even be routed via a cellular phone, using Internet telephony, or any communication medium for that matter.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for allowing a user to remotely interface a computer telephony integration (CTI) architecture, comprising:

(a) receiving a telephone call from a caller;
(b) routing the telephone call to a remote user;
(c) ascertaining an identifier associated with the caller;
(d) retrieving information associated with the caller utilizing the identifier; and
(e) transmitting the information to the remote user utilizing a network, wherein the information is capable of being viewed using a Hypertext Transfer Protocol (HTTP) application;
wherein the information is displayed via an interface including a window used to display:
a current status of a telephone connection between the remote user and a switch,
an indication as to whether a telephone is currently in communication with the switch, and
a time when the communication was established;
said window including:
an initiate pop forwarding icon for automatically forwarding the information to another remote user utilizing a forwarding receiver identifier entered using at least one forwarding field that is displayed upon the selection of the pop forwarding icon,
a disconnect icon for communicating a command to the CTI architecture utilizing the network to disconnect the telephone connection, thus terminating the communication,
a message window for displaying messages received,
a message send icon for sending messages to another remote user utilizing a message receiver identifier entered using at least one message field that is displayed upon the selection of the message send icon, and an extension window for identifying the telephone to which the telephone call is routed, wherein an extension is capable of being changed.

2. The method as recited in claim 1, and further comprising the step of receiving a log-in request from the remote user utilizing the network, wherein the log-in request is sent using the Hypertext Transfer Protocol application.

3. The method as recited in claim 1, wherein the HTTP application includes a browser.

4. The method as recited in claim 1, wherein the network includes the Internet.

5. The method as recited in claim 1, wherein the information is automatically displayed upon the receipt thereof by the HTTP application.

6. The method as recited in claim 5, wherein the information is sent to the user utilizing push technology.

7. The method as recited in claim 5, wherein the information is displayed in a pop-up window.

8. The method as recited in claim 1, wherein the CTI architecture is a component of a call center, and the user is a call center employee.

9. The method as recited in claim 1, wherein the telephone call is routed to a cellular phone.

10. A computer program product for allowing a user to remotely interface a computer telephony integration (CTI) architecture, comprising:

(a) computer code for receiving a telephone call from a caller;

(b) computer code for routing the telephone call to a remote user;

(c) computer code for ascertaining an identifier associated with the caller; (d) computer code for retrieving information associated with the caller utilizing the identifier; and (e) computer code for transmitting the information to the remote user utilizing a network, wherein the information is capable of being viewed using a Hypertext Transfer Protocol (HTTP) application;

wherein the information is displayed via an interface including a window used to display:

a current status of a telephone connection between the remote user and a switch, an indication as to whether a telephone is currently in communication with the switch, and a time when the communication was established;

said window including;

an initiate pop forwarding icon for automatically forwarding the information to another remote user utilizing a forwarding receiver identifier entered using at least one forwarding field that is displayed upon the selection of the pop forwarding icon, a disconnect icon for communicating a command to the CTI architecture utilizing the network to disconnect the telephone connection, thus terminating the communication, a message window for displaying messages received, a message send icon for sending messages to another remote user utilizing a message receiver identifier entered using at least one message field that is displayed upon the selection of the message send icon, and an extension window for identifying the telephone to which the telephone call is routed, wherein an extension is capable of being changed.

11. The computer program product as recited in claim 10, and further comprising computer code for receiving a log-in request from the remote user utilizing the network, wherein the log-in request is sent using the Hypertext Transfer Protocol application.

12. The computer program product as recited in claim 10, wherein the HTTP application includes a browser.

13. The computer program product as recited in claim 10, wherein the network includes the Internet.

14. The computer program product as recited in claim 10, wherein the information is automatically displayed upon the receipt thereof by the HTTP application.

15. The computer program product as recited in claim 14, wherein the information is sent to the user utilizing push technology.

16. The computer program product as recited in claim 14, wherein the information is displayed in a pop-up window.

17. The computer program product as recited in claim 10, wherein the CTI architecture is a component of a call center, and the user is a call center employee.

18. The computer program product as recited in claim 10, wherein the telephone call is routed to a cellular phone.

19. A system for allowing a user to remotely interface a computer telephony integration (CTI) architecture, comprising:

(a) logic for receiving a telephone call from a caller;

(b) logic for routing the telephone call to a remote user;

(c) logic for ascertaining an identifier associated with the caller;

(d) logic for retrieving information associated with the caller utilizing the identifier; and (e) logic for transmitting the information to the remote user utilizing a network, wherein the information is capable of being viewed using a Hypertext Transfer Protocol (HTTP) application;

wherein the information is displayed via an interface including a window used to display:

a current status of a telephone connection between the remote user and a switch, an indication as to whether a telephone is currently in communication with the switch, and a time when the communication was established;

said window including:

an initiate pop forwarding icon for automatically forwarding the information to another remote user utilizing a forwarding receiver identifier entered using at least one forwarding field that is displayed upon the selection of the pop forwarding icon, a disconnect icon for communicating a command to the CTI architecture utilizing the network to disconnect the telephone connection, thus terminating the communication, a message window for displaying messages received, a message send icon for sending messages to another remote user utilizing a message receiver identifier entered using at least one message field that is displayed upon the selection of the message send icon, and an extension window for identifying the telephone to which the telephone call is routed, wherein an extension is capable of being changed.

20. A method for sending information to be read by a Hypertext Transfer Protocol (HTTP) application, comprising:

(a) identifying an event;

(b) generating a uniform resource locator (URL) in response to the event, and (c) sending the URL to a remote user utilizing a network such that information relating to the event is automatically displayed via the HTTP application;
  wherein the information is displayed via an interface including a window used to display:
    a current status of a telephone connection between the remote user and a switch,
    an indication as to whether a telephone is currently in communication with the switch, and
    a time when the communication was established;
  said window including:
    an initiate pop forwarding icon for automatically forwarding the information to another remote user utilizing a forwarding receiver identifier entered using at least one forwarding field that is displayed upon the selection of the pop forwarding icon,
    a disconnect icon for communicating a command to computer telephony integration (CTI) architecture utilizing the network to disconnect the telephone connection, thus terminating the communication,
    a message window for displaying messages received,
    a message send icon for sending messages to another remote user utilizing a message receiver identifier entered using at least one message field that is displayed upon the selection of the message send icon, and
    an extension window for identifying the telephone to which the telephone call is routed, wherein an extension is capable of being changed.

21. The method as recited in claim 20, wherein the event is a computer telephony integration (CTI) event.

22. The method as recited in claim 20, wherein the event includes a request to send a message between the remote user and another user.

23. A computer program product for sending information to be read by a Hypertext Transfer Protocol (HTTP) application, comprising:
  (a) computer code for identifying an event;
  (b) computer code for generating a uniform resource locator (URL) in response to the event; and
  (c) computer code for sending the URL to a remote user utilizing a network such that information relating to the event is automatically displayed via the HTTP applications:
  wherein the information is displayed via an interface including a window used to display:
    a current status of a telephone connection between the remote user and a switch,
    an indication as to whether a telephone is currently in communication with the switch, and
    a time when the communication was established;
  said window including:
    an initiate pop forwarding icon for automatically forwarding the information to another remote user utilizing a forwarding receiver identifier entered using at least one forwarding field that is displayed upon the selection of the pop forwarding icon,
    a disconnect icon lot communicating a command to computer telephony integration (CTI) architecture utilizing the network to disconnect the telephone connection, thus terminating the communication,
    a message window for displaying messages received,
    a message send icon for sending messages to another remote user utilizing a message receiver identifier entered using at least one message field that is displayed upon the selection of the message send icon, and
    an extension window for identifying the telephone to which the telephone call is routed, wherein an extension is capable of being changed.

24. The computer program product as recited in claim 23, wherein the event is a computer telephony integration (CTI) event.

25. The computer program product as recited in claim 23, wherein the event includes a request to send a message between the remote user and another user.

* * * * *